Patented Oct. 2, 1934

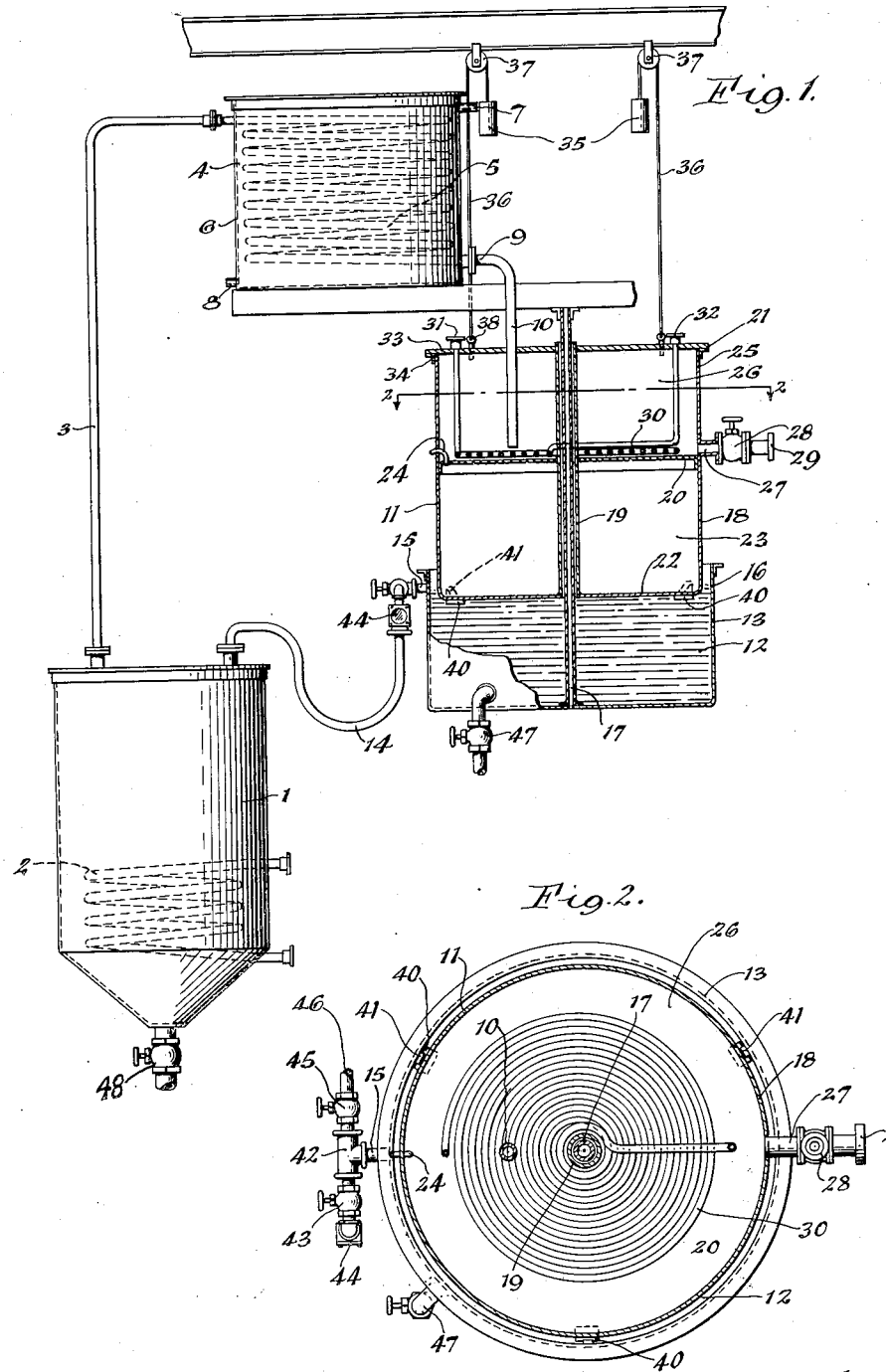

1,975,222

UNITED STATES PATENT OFFICE 1,975,222

VAPORIZATION PROCESS AND APPARATUS THEREFOR

Robert Vaughan Brown, Hamburg, N. Y., assignor to National Aniline and Chemical Company, Inc., New York, N. Y., a corporation of New York Application December 29, 1930, Serial No. 505,252

11 Claims. (Cl. 260—159)

This invention relates to a method of vaporization and apparatus therefor, and more particularly to a process and apparatus for maintaining a regulated amount of liquid in a boiling mixture undergoing chemical reaction. It is especially concerned with a process and apparatus whereby the concentration (and thereby the boiling-point) of a mixture of naphthalene alpha-monosulfonic acid, naphthalene beta-monosulfonic, sulfuric acid and water may be regulated during the hydrolysis of the naphthalene alpha-monosulfonic acid.

In the manufacture of certain chemical products, a reaction mixture is heated to boiling, a portion of the mixture is distilled off, and additional liquid material is added to the reaction mixture to replace it. It is frequently desirable that the material be added to the reaction mixture in an amount which corresponds to the portion of the mixture removed by distillation. This requires careful watching of the distillation and frequent regulation of valves, and the like.

In the manufacture of naphthalene beta-monosulfonic acid substantially free from naphthalene alpha-monosulfonic acid, for example, from a mixture of naphthalene alpha- and beta-monosulfonic acids, such as can be obtained by sulfonating naphthalene under well-known conditions, the mixture of sulfonic acids is heated to boiling with dilute sulfuric acid. During the course of the heating, the naphthalene alpha-monosulfonic acid is hydrolyzed to naphthalene and sulfuric acid, and the naphthalene formed is removed by vaporization. During the vaporization of the naphthalene, water is also removed. For efficient operation of the process, it is desirable that water be added to the reaction mixture in an amount sufficient to maintain the boiling-point of the mixture within the range of a few degrees. Heretofore this has been accomplished by adding water from a valved pipe, the valve being adjusted in accordance with changes in the reaction conditions. This arrangement is unsatisfactory for commercial operation, however; as it either increases the cost of operation of the process by requiring the employment of an operator to observe the reaction and regulate the valve in accordance with the observations; or else it results in a product contaminated by impurities produced by the addition of an improper amount of water to the reaction mixture during the hydrolysis, and a consequent undesired alteration of the boiling point of the mixture.

An object of the present invention is to provide a simple and effective process and apparatus for automatically introducing a liquid into a mixture of substances undergoing vaporization in an amount which is regulated by the extent of the vaporization of the mixture.

An additional object of the invention is to provide a process and apparatus for introducing a liquid into a boiling mixture in an amount proportioned to the weight of material vaporized from said mixture.

Another object of the invention is to provide a process and apparatus for automatically adding a liquid to a mixture undergoing chemical reaction in an amount proportioned to the rate at which the reaction is proceeding.

A further object of the invention is to provide a simple process and apparatus for adding water to a boiling mixture of dilute sulfuric acid and naphthalene alpha- and beta-monosulfonic acids in an amount substantially equal to the weight of naphthalene and water vaporized from the mixture, which process and apparatus are simple in construction, substantially automatic in operation, and require little, if any, observation or attention.

Other objects of the invention will in part be obvious and will in part appear hereinafter.

The invention accordingly comprises the several steps and the relation of one or more of such steps with respect to others thereof, and the apparatus embodying features of construction, combination of elements and arrangement of parts which are adapted to effect such steps which will all be exemplified in the following detailed disclosure and illustrated in one of its embodiments in the accompanying drawing. The scope of the invention will be indicated in the claims.

In the practice of the present invention, a liquid is added to a mixture of substances undergoing vaporization by removing vapor from the mixture, forming a condensate from said vapor, forming a body of the liquid to be added, displacing liquid from said body of liquid by the weight of the condensate, and adding the displaced liquid to the mixture.

One form of apparatus embodying the invention, and providing for the carrying out of the process briefly described above, comprises the combination of a still, a condenser for vapors generated by said still, a reservoir for liquid, and means operated by said condensate for causing liquid to flow from said reservoir into said still. In a preferred form of apparatus, the reservoir has an outlet for the liquid which leads to the still, and contains a receiver for the condensate which is adapted to float on the liquid in the reservoir and is so constructed and arranged that the addition of condensate to the receiver causes a substantially equal weight of the liquid to flow from the reservoir into the still.

The invention will be further described in connection with its application to the well-known removal by hydrolysis of naphthalene monosulfonic acids from mixtures containing them as impurities, but it will be understood that the invention is not limited thereto.

A mixture of naphthalene alpha- and beta-monosulfonic acids is heated to boiling with water and sulfuric acid. During the course of the heating the naphthalene alpha-monosulfonic acid is hydrolyzed, and water, naphthalene and some acid are vaporized. In order to carry out the reaction in the desired manner, water is added to the reaction mixture, preferably in an amount equal to the weight of the vapors removed.

In carrying out the hydrolysis in accordance with a preferred embodiment of the present invention, the addition of water to the reaction mixture is effected by condensing the vapors given off by the reaction mixture, causing the condensate to displace an equal weight of water from a body of water, and adding the displaced water to the reaction mixture.

For a fuller understanding of the invention reference should be had to the following detailed description taken in connection with the accompanying drawing in which Figure 1 is an elevation, partly in section, of one form of apparatus embodying the invention, and Figure 2 is a sectional view of a part of the apparatus shown in Figure 1, taken along the line 2—2 of Figure 1.

Referring to the drawing, numeral 1 is a still heated in any suitable manner, as for example by steam coil 2, and having a vapor line 3 leading to a condenser 4, which is shown as a coil 5 contained in a tank 6 through which circulates a cooling liquid, such as water, by means of the inlet and outlet 7 and 8, respectively. The outlet 9 of the condenser is connected with a conduit 10 leading into a receiver 11 which is arranged to float on the surface of a body of water 12 contained in a tank or reservoir 13. A conduit 14 connecting with an overflow outlet 15 from the reservoir 13 serves to introduce water 12 into the still 1.

The reservoir 13 is shown as a vertical cylindrical tank 16 closed at the bottom, open at the top, and having a shaft 17 secured to the bottom thereof and mounted axially therein.

The receiver 11 is shown as a closed-bottom, vertical cylindrical tank 18 of lesser diameter than the tank 16, and telescopically mounted therein in spaced relation to the walls of the tank 18 on a hollow shaft 19, which is of a sufficiently greater diameter than the shaft 17 to enable it to slide on such shaft as a guide.

An annular plate 20, secured to the inner wall of the cylindrical tank 18 and the hollow shaft 19 between the top 21 and bottom 22 of the tank 18, forms with the bottom 22 of the tank a closed air-chamber 23 which serves to increase the buoyancy of the receiver 11. A tube 24, extending through the wall of the tank 18 and the plate 20 into the interior of the air-chamber 23, forms a breather-pipe for the said chamber, permitting the air in the chamber to expand and contract with changes in temperature without imposing strains upon the joints of the air-chamber which might produce leaks.

The plate 20 also serves as a false bottom for the tank 18 and forms with the upper portion 25 of the wall of the tank a receiving chamber 26 for the condensate from the condenser 4. An outlet 27 in the upper portion 25 of the wall of the tank 18, flush with the false bottom 20 and having a valve 28 and a separable coupling 29 for connection to a suitable discharge line (not shown), serves for the removal of liquid from the chamber 26. A coil 30, adapted to contain a suitable heating agent, such as steam, is contained within the chamber 26, and has separable couplings 31 and 32 for connection to a suitable source of supply of the heating agent, such as a steam line (not shown). A cover 33, secured to a flange 34 formed on the upper edge of the tank 18 and having suitable openings for the conduit 10, shafts 17 and 19, and the ends of the steam coil 30, aids in preventing loss by evaporation of condensate collected in the receiving chamber 26.

Weights 35, supported by flexible cables 36 passing over pulleys 37 and secured to the flange 34, as by eye-bolts 38, serve to counter-balance the receiver 11 and thereby assist in maintaining it floating on the surface of the water 12 in the reservoir 13.

The receiver 11 may also have the form of a simple closed-bottom cylindrical tank without an air-chamber for increasing its buoyancy, without a cover, and without counterweights. The construction exemplified in the specific embodiment above described is preferred, however, for efficiency in operation.

To prevent the receiver 11 from being entirely withdrawn from within the reservoir 13 by accident, suitable stops are provided to limit the outward movement of receiver 11. These are shown as plates 40 secured to the bottom 22 of the tank 18 in cooperating relation with lugs 41 secured to the inner wall of the tank 16 at a height sufficient to permit the empty receiver 11 to float on the surface of the water 12 without causing pressure on the lugs 41 when the reservoir 13 is filled with the water to the overflow outlet 15.

The overflow outlet 15 of the reservoir 13 is connected to the return conduit 14 through one arm of a T 42, a valve 43 and a sight glass 44. The other arm of the T 42 is connected through a valve 45 with a discharge pipe 46. A valved pipe 47 provides a drainage outlet for the reservoir 13; and a valved pipe 48 serves as a discharge outlet for the still 1.

In the operation of the apparatus above described, the receiver 11 and reservoir 13 are first prepared for operation by adding water to the reservoir 13 from a suitable supply (not shown), valve 43 being closed and valve 45 being open. As the water level in the reservoir rises it raises the receiver 11 into operative position. When the water in the reservoir has risen to such a height that it overflows through the outlet 15 and discharge pipe 46, the addition of water is stopped and excess water is allowed to overflow until the water level in the reservoir 13 comes to rest at the outlet 15. Valve 45 is then closed and valve 43 is opened.

A mixture of naphthalene alpha-monosulfonic acid, naphthalene beta-monosulfonic acid, water and sulfuric acid, such as may be obtained in the well-known manner by diluting with water the sulfonation mass resulting from the sulfonation of naphthalene under well-known conditions, is charged into the still 1 through a suitable charging opening (not shown) which is then suitably closed. Heat is then applied to the mixture, for example, by means of steam coil 2, to raise the temperature of the mixture to its boiling point and to keep the mixture boiling. As a result of the well-known hydrolysis reaction which takes place in the mixture, the naphthalene alpha-monosulfonic acid is converted to sulfuric acid and naphthalene. The naphthalene produced vaporizes from the mixture and takes with it water and a small amount of acid.

The vapors of naphthalene and water which are given off from the still 1 pass through vapor line 3 into condenser 4 which is maintained at a temperature sufficiently low to liquify the water and the naphthalene but sufficiently high to maintain the naphthalene in a molten condition (e. g., about 82° to 95° C., preferably, about 82° to 85° C.). The naphthalene and water are thus condensed and flow through conduit 10 into the chamber 26 where they are collected and maintained separate from the water in the reservoir 13, the walls of the tank 18 acting as a partition. The increase in the weight of the receiver 11 due to the accumulation of the water and naphthalene in the chamber 26 causes the receiver 11 to sink lower within the reservoir 13, thereby displacing a part of the water 12 which overflows through the outlet 15 and conduit 14 into the still 1. This operation is continued until all of the naphthalene alpha-monosulfonic acid has been hydrolyzed, water continuously and automatically being charged to the still 1 to replace the water and naphthalene vaporized therefrom.

At the completion of the reaction, heating is discontinued and the naphthalene beta-monosulfonic acid and sulfuric acid remaining in the still are withdrawn through outlet 48 for further treatment. The naphthalene and water collected in the collecting chamber 26 of the receiver 11 may then be removed and recovered in any suitable manner; for example, by connecting a suitable discharge line to the separable coupling 29 on the outlet 27, opening valve 28 and permitting the liquid in the chamber 26 to drain out. If necessary, any solidified naphthalene may be remelted and run out through the outlet 27 by connecting the separable couplings 31 and 32 on the steam coil 30 to a suitable steam line, and passing steam through the coil 30. When the chamber 26 has been emptied of its contents, valve 28 is closed, the discharge line is disconnected from the outlet 27, and, if employed, the steam line is disconnected from the couplings 31 and 32. The reservoir 13 is then again refilled with water and the receiver 11 is again raised, in the manner above described, in preparation for the next run.

It will be realized that the invention is not limited to the process and apparatus and the details thereof which are set forth in the foregoing description. Thus, the invention is not limited to the addition of water to a reaction mixture containing a naphthalene sulfonic acid undergoing hydrolysis, but may be employed for the addition of any suitable liquid to any mixture of substances undergoing vaporization wherein such addition is desired.

The invention also includes within its scope a process in which only a part of the vapor given off by a mixture of substances undergoing vaporization is condensed and the condensate is employed to produce a flow of liquid to the mixture by displacement from a body of the liquid; and it includes a process in which all of the vapor is condensed but only a portion of the condensate is employed for the displacement.

It also includes a process in which only a portion of the displaced liquid is added to the vaporizer. Thus, by opening valves 43 and 45 to the proper extent a definite fractional part of displaced liquid may be added to the still and the remainder may be bled off through the discharge pipe 46.

Various changes may be made in the details of construction, combination of elements and relation of the parts of the apparatus, as will be evident to one skilled in the art. For example, heating means for melting the condensate may be omitted when the condensate collected is a liquid. On the other hand, when a portion of the condensate is a solid, as in the specific illustration hereinbefore given, a removable screen may be provided in the outlet from the receiving chamber; so that a separation of the liquid portion of the condensate from the solid portion thereof may be effected in the receiving chamber, at the completion of the operation of the process, by draining off the liquid portion of the condensate through the screen, which will retain the solid portion, and then removing the solid portion, as for example, by melting it and permitting it to pass out in the liquid form, with or without removal of the screen.

Since certain changes in the carrying out of the above process and in the construction, combination and arrangement of the parts set forth may be made without departing from the scope of the invention, it is intended that all matter contained in the above description and shown in the accompanying drawing shall be interpreted as illustrative and not in a limiting sense, except as limited by the claims.

It is also to be understood that the following claims are intended to cover, in addition to the generic and specific features of the invention herein described, all statements of the scope of the invention which, as a matter of language, might be said to fall therebetween.

I claim:

1. The process of adding a liquid to a mixture of substances, which comprises forming a body of the liquid to be added, generating vapor from the mixture, forming a condensate of resulting vapor, displacing from said body of liquid by means of condensate a weight of liquid equal to the weight of the displacing condensate, and adding displaced liquid to said mixture.

2. The process of adding a liquid to a mixture of substances, which comprises generating vapor from the mixture, forming a condensate of resulting vapor, forming a body of liquid to be added having a composition different from that of the condensate, displacing from said body of liquid by means of condensate a weight of liquid equal to the weight of the displacing condensate, and adding displaced liquid to said mixture.

3. The process of adding a liquid to a mixture of substances, which comprises forming a body of the liquid to be added, boiling the mixture of substances, forming a condensate of resulting vapor, displacing from the body of liquid by means of the condensate a weight of liquid equal to the weight of the displacing condensate, and adding displaced liquid to the boiling mixture.

4. The process of adding a liquid to a mixture of substances, which comprises forming a body of the liquid to be added, boiling the mixture of substances, forming a condensate of resulting vapor, maintaining said condensate separate from said liquid, displacing from the body of liquid by means of condensate a weight of liquid equal to the weight of the displacing condensate, and adding displaced liquid to the boiling mixture.

5. The process of adding water to a reaction mixture containing a naphthalene sulfonic acid which is undergoing hydrolysis, which comprises forming a body of water, removing vapor from the reaction mixture, forming a condensate of removed vapor, displacing from the body of water by means of the condensate a weight of water equal to the weight of the condensate, and adding displaced water to the reaction mixture.

6. The process of adding water to a reaction mixture which contains naphthalene alpha-monosulfonic acid, naphthalene beta-monosulfonic acid and dilute sulfuric acid, in which the naphthalene alpha-monosulfonic acid is undergoing hydrolysis, and from which vapors of naphthalene and water are being evolved, which comprises forming a body of water, cooling evolved vapors to produce a condensate of water and naphthalene, collecting resulting condensate, displacing water from said body of water by the weight of collected condensate, and adding displaced water to the reaction mixture.

7. The process of adding water to a boiling reaction mixture which contains naphthalene alpha-monosulfonic acid, naphthalene beta-monosulfonic acid and dilute sulfuric acid, and in which the naphthalene alpha-monosulfonic acid is undergoing hydrolysis, which comprises forming a body of water, removing the vapors of napthalene and water given off from the boiling mixture, cooling said vapors to produce a liquid condensate of acidified water and naphthalene, collecting said condensate, floating said condensate on said body of water, thereby displacing from said body of water a weight of water equal to the weight of the condensate, and adding the displaced water to the reaction mixture.

8. An apparatus for adding liquid to a mixture undergoing vaporization, which comprises in combination a vaporizer, means for condensing vapors to form a condensate, a reservoir for liquid, means for collecting condensate and maintaining it separate from said liquid, means for displacing liquid from the reservoir by the weight of the collected condensate, and means for introducing displaced liquid into the vaporizer.

9. An apparatus for adding water to a boiling reaction mixture, which comprises in combination a still for heating the reaction mixture to the boiling point, a condenser for vapors given off by the reaction mixture, a reservoir for water, a receiver for condensate adapted to float on the water in the reservoir, means for introducing condensate from the condenser into the receiver to displace water in the reservoir, means for removing displaced water from the reservoir, and means for introducing displaced water into the still.

10. An apparatus for adding water to a boiling reaction mixture, which comprises in combination a still for heating the reaction mixture, a condenser for vapors given off by the reaction mixture, a reservoir for water having an overflow outlet leading to the still, a receiver for condensate adapted to float on the water in the reservoir, and a conduit for introducing condensate from the condenser into the receiver.

11. An apparatus for adding water to a boiling reaction mixture which, comprises in combination a still, a condenser for vapors given off by the still, a reservoir for water comprising a cylindrical tank having an overflow outlet leading to the still, a receiver for condensate adapted to float on the water in the reservoir comprising a cylindrical tank of smaller diameter than the reservoir telescopically mounted in spaced relation to the walls of the reservoir, and a conduit for introducing condensate from the condenser into the receiver.

ROBERT VAUGHAN BROWN.